INVENTORS
J. D. HUGHSON, V. P. KOVALCIK
AND W. R. SMITH
BY
THEIR ATTORNEY

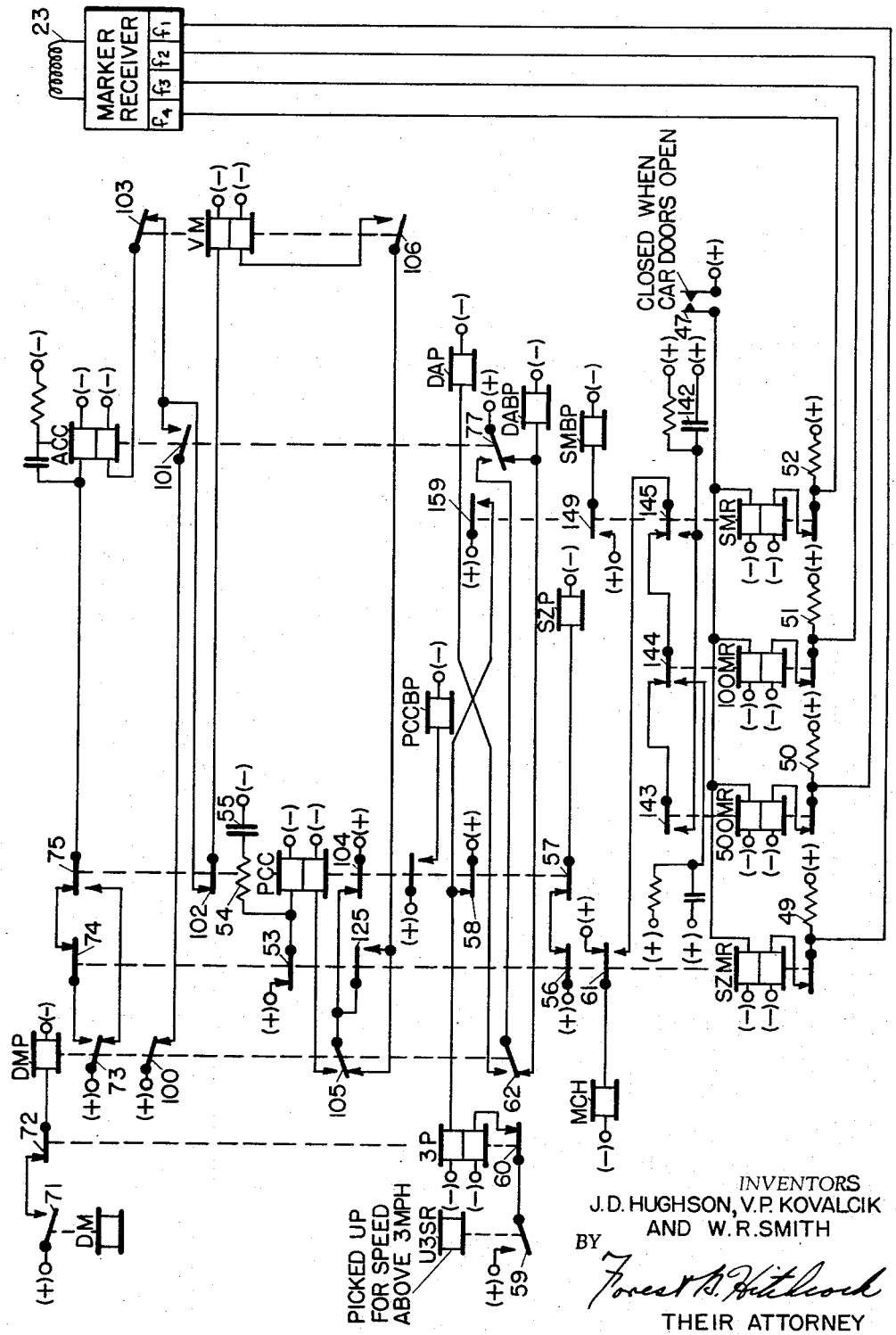

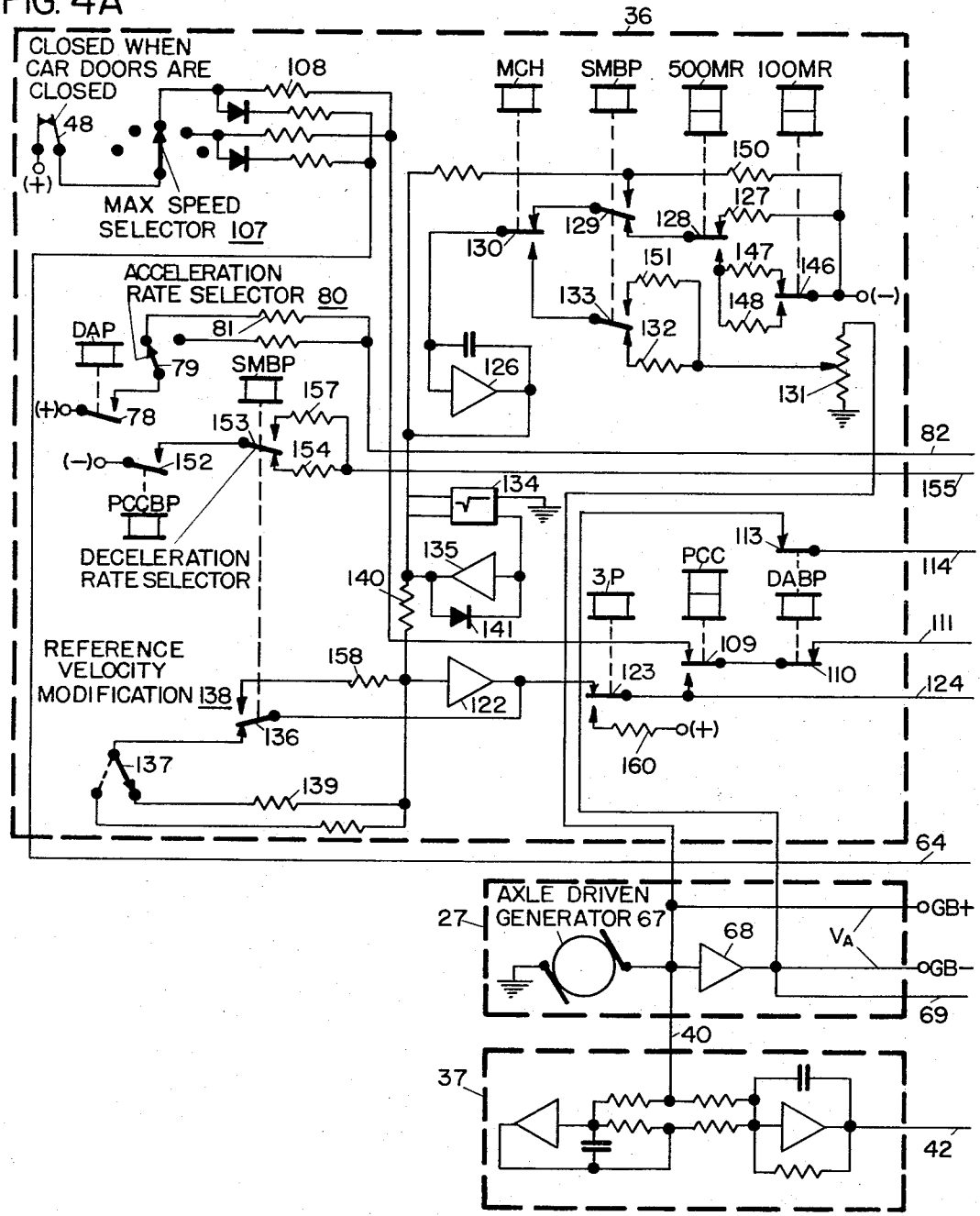

United States Patent Office 3,363,096
Patented Jan. 9, 1968

1

3,363,096
CONTROL SYSTEM FOR VEHICLES
J. Donald Hughson, Vincent P. Kovalcik, and Willis R. Smith, Rochester, N.Y., assignors to General Signal Corporation, Rochester, N.Y., a corporation of New York
Filed Oct. 23, 1965, Ser. No. 503,658
19 Claims. (Cl. 246—187)

This invention relates to control systems for vehicles, and it more particularly relates to feedback control systems for the automatic operation of vehicles along a right of way, such as a stretch of railway track.

The operation of rapid transit passenger vehicles requires smooth and efficient control of the vehicles to accelerate and decelerate at predeterminted rates to provide for the most efficient and comfortable ride of the passengers. Such precision can only be accomplished occasionally by a good operator, while it is desirable that the vehicles be operated consistently to provide precise operating patterns of both acceleration and deceleration.

The feedback control system according to the present invention operates according to three different modes. One of these modes is a starting, or acceleration mode, a second is a motoring, or constant velocity mode, and a third is a stopping, or programmed station stop mode. A different set of reference values is used for each of these modes of operation. These reference values in some modes represent desired speed and in other modes represent desired rates of acceleration or deceleration.

The right of way along which the vehicle is operated is divided into two classes of zones. One of these is conveniently called a motoring zone, and the other is called a station stop zone, which is generally provided at and in approach of a station platform. Occupancy of a station stop zone is detected on the vehicle by the passage of spaced wayside coils marking different stages in the passage of the vehicle through a station stop zone. The vehicle is considered as being in a monitoring zone except when the presence of the vehicle within a station stop zone has been registered. When it is registered on a vehicle that it has entered a station stop zone, the system automatically becomes activated into the stopping mode. Upon the operation of the vehicle doors at a station platform, the stopping mode control system is reset, and the acceleration mode becomes activated. When it is detected that the vehicle has accelerated to a predetermined point in approach of a desired velocity, the motoring mode is activated in response to such detection and the accelerating mode is deactivated. The vehicle remains operating in accordance with control by the motoring mode until there is a predetermined difference between the actual velocity and the desired velocity to reactivate the acceleration mode, or until the vehicle detects the entering of a station stop zone.

An object of the present invention is to automatically activate a mode of control for operation of a vehicle in accordance with its performance or location along a right of way.

Another object of the present invention is to selectively control a feedback control system to generate a control signal for automatically operating a vehicle in accordance with a selected one of a plurality of different sets of reference signals, dependent upon the performance of the vehicle and/or its location along a right of way.

Another object of the present invention is to generate a control signal for operating a vehicle in an analog computer, which in turn has its reference signals selected in accordance with a particular mode of operation that has been activated.

2

Another object of the present invention is to control the rate of deceleration in the stopping zone in accordance with the progress of the vehicle within the stopping zone.

Other objects, purposes and characteristic features of the present invention will be in part obvious from the accompanying drawings, and in part pointed out as the description of the invention progresses.

In describing the invention in detail, reference is made to the accompanying drawings wherein corresponding parts are identified by similar reference characters and wherein.

Figure 4B:
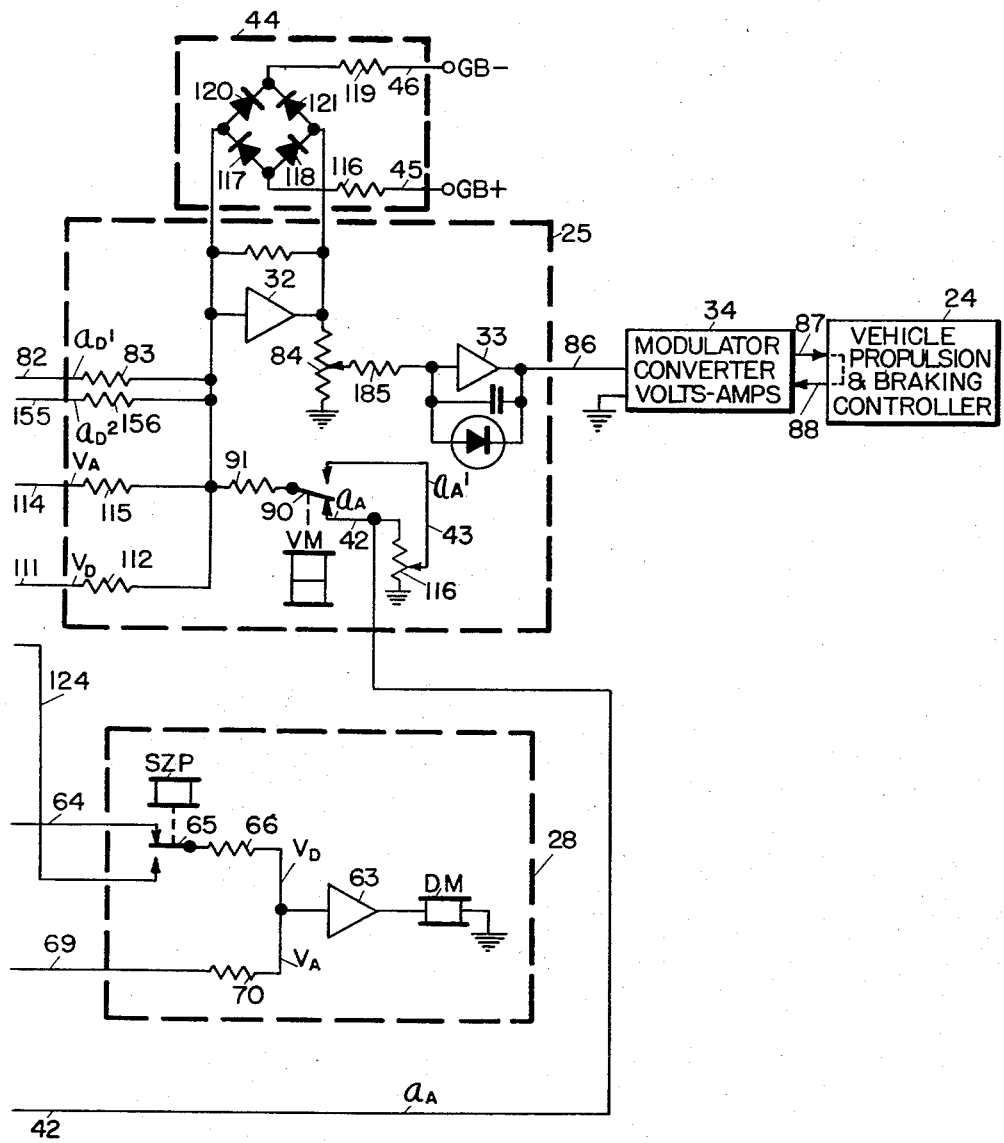

FIG. 3 is a circuit diagram illustrating circuit logic involved in the selective activation of the different modes of control for a vehicle according to the present invention; and FIGS. 4A and 4B when placed side by side illustrate electronic control apparatus for generating a signal to control the operation of a vehicle in accordance with the different modes of operation as they are activated by the circuit logic of FIG. 3.

Figure 1:
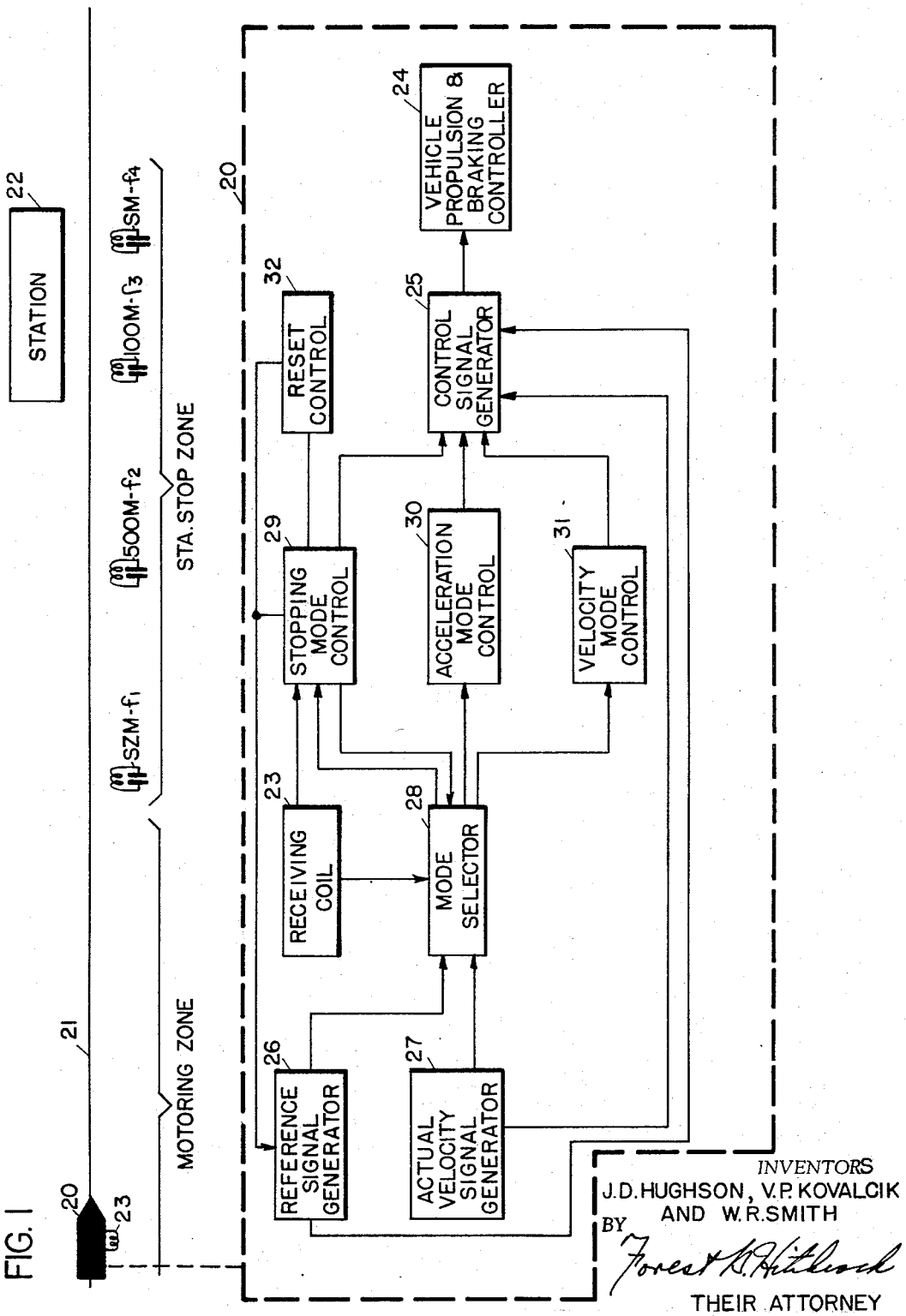
FIG. 1 is a block diagram of one embodiment of a vehicle control system according to the present invention.

With reference to FIG. 1, one embodiment of the present invention is illustrated as being applied to the control of a vehicle 20 as it passes along a railroad right of way 21, which is divided into at least two zones, one of which being a motoring zone and the second being a station stop zone. The station stop zone is in approach of a stopping point at a station 22. The station stop zone comprises a plurality of markers each of which is a tuned coil along the right of way for influencing a receiver coil 23 on the vehicle. Each of the marker coils is tuned to a different frequency, so that the passage of that coil by a vehicle carried coil 23 registers on the vehicle the position of the vehicle within the station stop zone. A zone marker SZM–f1 marks the entrance of the station stop zone which may be, for example, 3050 feet from the stopping point. A marker coil 500M–f2 is disposed, for example, 500 feet from the stopping point, a marker coil 100M–f3 is disposed, for example, 100 feet from the stopping point, and a marker coil SM–f4 is disposed, for example, 30 feet from the stopping point.

With reference to FIG. 1, the vehicle 20 is fully automatically controlled in accordance with the energization of a vehicle propulsion and braking controller 24. The controller 24 is governed by a control signal generator 25, which in turn includes analog computing apparatus for generating a control signal in accordance with input reference and feedback control signals. The reference control signals are generated by a reference velocity signal generator 26, and the feedback signal is generated by an actual velocity signal generator 27.

The selection of various reference velocity signals and actual velocity signals for use by the control signal generator 25 in generating a control signal is governed by a mode selector 28, which in turn is governed jointly by the receiving coil 23 and by a comparison of reference and actual velocity signals. The mode selector 28 selects a stopping mode control 29, an acceleration mode control 30 or a velocity mode control 31. A reset controller 32 is controlled by the operation of programming means on the vehicle to reset the stopping mode control 29 when the vehicle doors open and to render the reference velocity signal generator 26 effective when the doors close. It is to be understood that other means for resetting, either automatic or manual, may be used in accordance with the requirements of practice.

Figure 2:
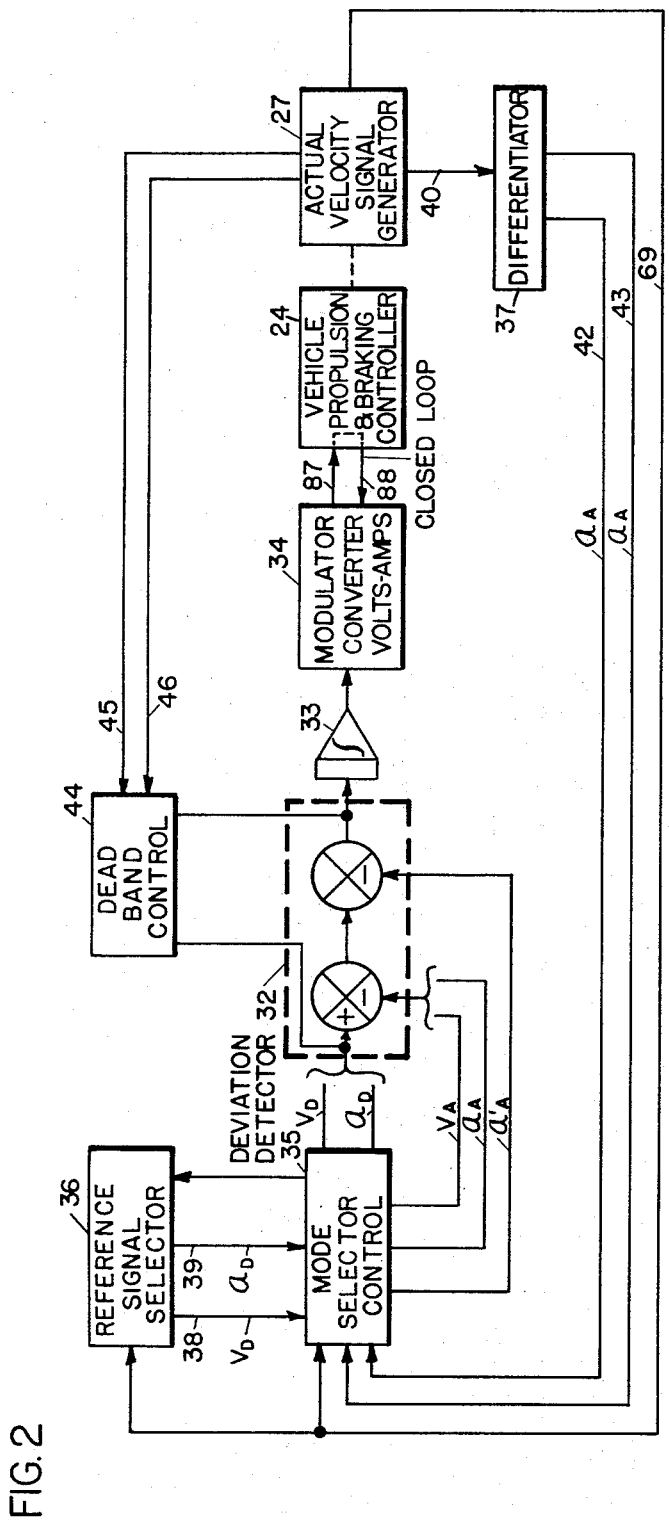
FIG. 2 is a schematic diagram illustrating the general organization of a feedback system according to one embodiment of the present invention.

The feedback control of the vehicle is more specifically illustrated in FIG. 2, wherein the vehicle propulsion and brake controller 24 is illustrated as being controlled by a closed loop circuit including wires 87 and 88, which are energized from a deviation detector 32 through an integrator 33, and a converter and modulator 34 for converting volts to amperes. The amount of current in the closed loop determines the control of positive tractive effort and braking of the vehicle. The closed loop is modulated, for example, between zero and 1 ampere, and values above .5 amp call for positive tractive effort. Braking is applied for values below .5 amp.

The deviation detector 32 is illustrated as having selective inputs which are selected by a mode selector control 35. The mode selector control 35 selects a velocity desired signal $V_D$ for application to wire 38, and it selects an acceleration desired signal $a_D$ for application to wire 39. An actual velocity signal $V_A$ is applied to wire 40 as an input to differentiator 37 by an actual velocity signal generator 27. The differentiator 37 has an actual acceleration output $a_A$ applied to wire 42 and an output $a_A'$ applied to wire 43. These outputs are applied selectively by the mode selector control 35 to the deviation detector 32 for comparison with other selected reference signals. When the system is operating in a velocity mode, the mode selector control 35 applies an actual velocity signal $V_A$ to the deviation detector 32 for comparison with a desired velocity signal $V_D$ selected by the reference signal selector 36.

A dead band control 44 is associated with the deviation detector 32 to provide a dead band for a predetermined velocity range, for example, as equivalent to plus or minus two miles per hour relative to the $V_D$ signal in which there will be no change in the output of deviation detector 32. This dead band control is governed both by positive and inverted velocity signals on wires 45 and 46 respectively from actual velocity signal generator 27. The dead band is a percentage of the actual velocity signal, such, for example, as plus or minus 2.5%.

With reference to FIG. 3, the circuit logic for the mode selector control 35 of FIG. 2 comprises a delta minus relay DM and associated repeater relays DMP, DAP and DABP. The relay DM is a detector relay which is actuated when the actual velocity signal is less than the desired signal by a predetermined amount. For example, if the desired velocity signal $V_D$ is compared with the actual velocity signal $V_A$, and the signals indicate the actual velocity to be less than the desired velocity by an equivalent speed of four miles per hour, the relay DM becomes picked up, and is maintained energized as long as such difference exists.

A stopping zone marker relay SZMR is used to register the entrance of a vehicle into the station stop zone. This relay is picked up upon passage of marker SZM–f1, and it has associated therewith a repeater relay SZP. Relays 500MR and 100MR are controlled in response to the passage of a vehicle over the coils 500M–f2 and 100M–f3 respectively to register the presence of the vehicle at these locations. A stop marker relay SMR is provided to register the passage of the vehicle passed the stop marker SM–f4. A marker change relay MCH is provided for use in correcting intermittently an integrated actual speed signal on a vehicle for use in determining a stopping pattern for the vehicle within the station stop zone.

A program vehicle control relay PCC is provided for governing the operation of the system, and this relay has associated therewith repeater relays PCCBP and 3P. An acceleration mode relay ACC is used for selection of inputs for the deviation detector 32 during an acceleration mode, and a velocity mode relay VM is used for selecting inputs to the deviation detector 32 during a velocity mode.

Having thus considered the general organization of the system according to the present invention, the system will be further described when considering typical conditions of operation.

Operation

Before considering in detail the specific circuit logic involved in the operation of the various devices, the general organization of the system relative to the selection of the different modes of operation will be considered. For this consideration, it will be assumed that a vehicle is at stop at a station platform and is ready to be started. While the vehicle is at the station platform, the operation of the car doors is effective to cause the picking up of all of the stop marker relays SMZR, 500MR, 100MR and SMR (see FIG. 3) upon the closure of door contact 47 when the car doors are opened. These relays when picked up are maintained energized by stick circuits until the passage of the vehicle past station stop marker coils at the next station. The starting of the vehicle is rendered effective in accordance with the closure of contact 48 (see FIG. 4A) upon the closure of the car doors to apply a desired velocity signal to the mode selector 28 (see FIG. 4B). Because the vehicle is at stop, and a desired velocity signal is applied to the mode selector 35, the delta minus relay DM becomes picked up, and in accordance with the picking up of this relay, the system is put into an acceleration mode, which is registered by the picking up of the acceleration relay ACC (see FIG. 3). The system continues to operate in the acceleration mode wherein an actual acceleration signal $a_A$ is compared with a selected desired acceleration signal $a_D$ in the deviation detector 32 until such time as an actual velocity $V_A$ approaches the value of a desired velocity signal $V_D$.

When the actual speed of the vehicle is within a predetermined speed such, for example, as four miles per hour relative to a selected reference speed, the relay DM becomes dropped away, and the system is put into a velocity mode in accordance with the picking up of the velocity mode relay VM (see FIG. 3). The picking up relay VM changes the inputs to the deviation detector 32 so that the deviation detector 32 now compares a desired velocity signal $V_D$ with an actual velocity signal $V_A$ rather than comparing desired and actual acceleration signals as is the case when the system is in the acceleration mode.

The velocity mode system continues to be activated until the vehicle enters the next station stop zone and the relay SZMR becomes dropped away upon passage of the marker SZM–f1 at the entrance to that station stop zone. The dropping away of this relay is effective, after relay PCC drops away, to change the input to the deviation detector 32 so that the deviation detector compares a reference desired speed signal that represents a braking pattern with the actual speed signal. The system remains in a velocity mode however, until the vehicle speed approaches the speed called for in the pattern, and then the stopping mode control is activated.

Acceleration mode

The circuit logic of FIG. 3 is illustrated to be in a condition which exists when a car is stopped at a station. The marker relays SZMR, 500MR, 100MR and SMR have been picked up, and are maintained energized by obvious stick circuits for their lower windings through resistors 49, 50, 51 and 52 respectively. In accordance with the energization of relay SZMR, the program car control relay PCC is energized through front contact 53 of relay SZMR. Relay PCC is made slow to drop away because of its upper winding being shunted by a resistor 54 connected in series with a capacitor 55.

With relays SZMR and PCC in their picked up positions, a repeater relay SZP is picked up by the energization of a circuit including front contact 56 of relay SZMR and front contact 57 of relay PCC. Also, the repeater relay 3P becomes picked up by the energization of an obvious circuit for its upper winding closed at front contact 58 of relay PCC. The lower winding of relay 3P is energized by a stick circuit whenever the vehicle is travelling at a speed greater than three miles per hour. Thus, this lower winding is deenergized when the vehicle is at stop, but is energized as long as the speed of the vehicle is above three miles per hour through front contact 59 of relay U3SR and front contact 60 of relay 3P. The marker change relay MCH is energized at this time by an obvious circuit closed at front contact 61 of relay SMZR. Because relay DMP is in its dropped away position at this time, its back contact repeater relay DABP is in its picked up position in accordance with the energization of a circuit closed through a back contact 77 of relay ACC. If relay ACC is up, relay DABP is picked up through front contact 77 of relay ACC and back contact 62 of relay DMP.

Having thus considered the conditioning of the system while a vehicle is at stop at a station, it will be assumed that the conditions are right for the vehicle to be started, and that the doors of the vehicle become closed by either manual or automatic control. In accordance with the closure of the doors, the contact 48 associated with the door operating mechanism (see FIG. 4A) becomes closed, and the closure of this contact renders the reference voltage signal generator 26 active to provide a selected desired velocity signal to the mode selector 28 (see FIG. 4B). This reference signal is selected in accordance with the conditions of traffic in advance of the vehicle by a suitable maximum speed selector 107, and it is applied as an input to amplifier 63 over wire 64 through front contact 65 of relay SZP and resistor 66. This signal is compared in the amplifier 63 with a signal indicative of the actual velocity of the vehicle. The actual velocity signal $V_A$ is obtained by an axle driven generator 67, the output of which is of positive polarity, and the polarity is changed by an amplifier 68 to provide a negative signal output over wire 69 through resistor 70 to the amplifier 63. It has been pointed out that the relay DM becomes picked up when the $V_A$ signal is less than the $V_D$ signal, this difference being, for example, a difference comparable to four miles per hour. Thus, with the vehicle stopped at the station platform, the relay DM becomes picked up because the reference signal is characteristic of the desired maximum speed and the actual velocity signal is zero.

With reference to FIG. 3, the picking up of relay DM causes the picking up of its repeater relay DMP by the energization of a circuit including front contact 71 of relay DM and front contact 72 of relay 3P. The picking up of relay DMP causes the picking up of the acceleration relay ACC by the energization of its upper winding through front contact 73 of relay DMP, front contact 74 of relay SZMR, front contact 75 of relay PCC and upper winding of relay ACC. The picking up of relay ACC causes the dropping away of its back contact repeater relay DABP by the opening of back contact 77 and relay DAP becomes picked up by the energization of a circuit including front contact 77 of relay ACC and front contact 62 of relay DMP.

With reference to FIG. 4A, the picking up of relay DAP renders the reference signal generator 36 effective to apply a desired acceleration signal $a_{D1}$ to the deviation detector 32. This signal is applied through front contact 78 of relay DAP, contact 79 of acceleration rate selector 80, resistor 81, wire 82 and resistor 83. This signal is of positive polarity, and it is compared in the deviation detector 32 with an actual acceleration signal $a_A$ that is obtained from differentiator 37 after the vehicle has been started.

Because of there being a difference in the inputs of the deviation detector 32, the detector 32 has an output signal which is applied through a potentiometer 84 and a resistor 85 as an input to the integrator 33. The integrator 33 provides an output on wire 86 which is analogous to the tractive effort demand, the output of the integrator 33 being changed at a rate proportional to the magnitude of deviation as detected by the deviation detector 32. The voltage signal potential on wire 86 is applied to converter 34 where it is converted into a comparable analog current signal which is applied in turn to a closed loop circuit for operation of the vehicle propulsion and brake controller 24. This closed loop circuit is represented by the wires 87 and 88. The controller 24 senses the flow of current in the loop circuit and operates the vehicle in accordance with current flow in the closed loop circuit.

When operation of the vehicle is initiated in accordance with a signal applied to wires 87 and 88, the axle driven generator 67 (see FIG. 4A) generates an output which is applied as an input to differentiator 37, which in turn provides an output of negative polarity which is an analog of the actual acceleration. This output is applied over wire 42 through back contact 90 of relay VM and resistor 91 as an input to the deviation detector 32. This is compared with the reference signal $a_{D1}$ of positive polarity, and the control of the vehicle is thus regulated during the acceleration mode in accordance with this comparison. It will be noted that the reference signal for the desired acceleration rate is obtained through the acceleration rate selector 80, and this selector can take the form of any type of a selecting device that may be remotely controlled or may be controlled in accordance with the performance of the vehicle or other vehicles in accordance with the requirements of practice.

*Velocity mode*

When the speed of the vehicle has reached within approximately four miles per hour of the selected reference speed, the mode selector 28 is activated to drop the relay DM (see FIG. 4B) and thus initiate the transfer of the control of the system from an acceleration mode to a velocity mode. The dropping away of relay DM (see FIG. 3) causes the dropping away of relay DMP by the opening of its circut at front contact 71, and the dropping away of relay DMP closes a circuit for the energization of the velocity mode relay VM. This circuit includes back contact 100 of relay DMP, front contact 101 of relay ACC, front contact 102 of relay PCC and upper winding of relay VM. A stick circuit is closed for the lower winding of relay ACC to maintain it energized until the relay VM becomes picked up. This stick circuit includes back contact 100 of relay DMP, front contact 101 of relay ACC, and back contact 103 of relay VM. Relay VM is maintained picked up by the energization of a stick circuit for its lower winding including front contact 104 of relay PCC, back contact 105 of relay DMP and front contact 106 of relay VM. The acceleration mode relay ACC becomes dropped away after the relay VM has become picked up. The dropping away of relay DMP also causes the picking up of its back contact repeater relay DABP.

With reference to FIG. 4A, the dropping away of relay DAP removes the acceleration desired reference signal $a_{D1}$ from the deviation detector 32 by the opening of front contact 78. Because of the relays PCC and DABP being both in their picked up positions, a desired velocity signal $V_D$ is applied as an input to the deviation detector 32, in accordance with the selection made by maximum speed selector 107. The maximum speed selected can be determined automatically in accordance with traffic conditions along the right of way in advance of the vehicle. The circuit for applying the desired velocity signal to the deviation detector 32 includes door contact 48, maximum speed selector 107, resistor 108 (if the speed selector 107 is in the position illustrated), front contact 109 of relay PCC, front contact 110 of relay DABP, wire 111 and resistor 112. This signal is compared with an actual velocity signal $V_A$ of negative polarity which is obtained as an output of amplifier 68 and is applied to amplifier 32 through front contact 113 of relay DABP, wire 114 and resistor 115.

A modified actual acceleration signal $a_A'$ is applied as an input to amplifier 32 during the velocity mode to optimize system performance. This signal is applied during the velocity mode from wire 42 (see FIG. 4A) through potentiometer 116, front contact 90 of relay VM and through resistor 91. The fraction of the acceleration signal applied to amplifier 32 through resistor 91 by potentiometer 116 determines the output signal of detector 32 as the actual velocity signal approaches the same level as the reference velocity signal. This damping effect is accomplished in that the modified actual acceleration signal $a_A'$, when properly summed with $V_D$ and $V_A$, allows connective action to be taken before $V_A$ exceeds $V_D$. Thus as the vehicle approaches its desired speed, $V_A+a_A'$ becomes greater than $V_D$. This provides a net result of changing the polarity of the output of deviation detector 32 to a positive polarity, which in turn causes the integrator 33 to start to decrease its output signal. In accordance with the decrease in the output signal of integrator 33, the current in the loop circuit including wires 87 and 88 for controlling the propulsion and braking controller 24 is reduced, thus causing the rate of acceleration of the vehicle to decrease as the actual velocity approaches the reference velocity. The output of the amplifier 33 will be reduced to a value to maintain the desired speed. This amplifier will integrate down as long as its input is positive, the rate of integration depending upon the magnitude of the positive signal output of the amplifier 32. If this output signal of amplifier 32 ceases, the output of amplifier 33 will remain with the output it attained while the positive output of amplifier 32 was present. Therefore, the tractive effort to the vehicle will remain constant until a positive or negative input is fed into the amplifier 33, which will cause a corresponding changing output.

When the vehicle is operated in the velocity mode, if it becomes below reference speed, the reference velocity will predominate, causing a negative input into amplifier 33, and if the velocity of the vehicle becomes above the reference speed, the actual velocity will predominate, and causes positive input into amplifier 33. To maintain a band width, above and below the reference speed, and to have it proportional to the actual velocity, an input bias is applied to the amplifier 32 which is obtained from the actual and inverted actual velocity signals. Only when this band width is exceeded, is the difference between the actual and reference values effective to change the tractive effort demand to the controller of the vehicle. To provide this bias, the dead band control 44 is connected across the amplifier 32. This dead band control applies an actual velocity signal of positive polarity through a resistor 116 and through diodes 117 and 118 across the input and output terminals of amplifier 32. Similarly, an inverted actual velocity signal is obtained from the output of amplifier 68 and applied through resistor 119 and rectifiers 120 and 121 to the respective input and output terminals of the amplifier 32.

The potentiometer 84 which is connected between the output of amplifier 32 and ground is used as an adjustment for the rate of change of the amplifier 33. The normal setting is to limit the rate of acceleration of the vehicle to two miles per hour, per second, per second.

*Programmed station stop mode*

When the vehicle passes the marker SZM–$f1$ (see FIG. 1) which marks the entrance to a station stop zone, a reference signal is set up for use in controlling the vehicle that is continuously corrected in accordance with distance to go to form a pattern for a programmed station stop. The control of the vehicle according to this pattern is rendered effective whenever the vehicle is travelling at a speed under velocity mode control that is close enough to the speed indicated by the reference pattern to an extent to cause the dropping of relay DM. In order that the mode selector 28 can operate in this manner, the reference signal input to the amplifier 63 (see FIG. 4B) is shifted to the reference stopping pattern signal by the dropping away of relay SZP to open the circuit at front contact 65 by which a reference signal has been applied over wire 64, and to close back contact 65 to connect an output of amplifier 122 (see FIG. 4A) through front contact 123 of relay 3P, wire 124, back contact 65 of relay SZP and resistor 66 to the input of amplifier 63.

With reference to FIG. 3, the relay SZP is dropped away at this time because of the opening of its circuit at front contact 56 upon the dropping away of relay SZMR in response to passage of the marker SZM–$f1$. Relay SZMR is dropped away upon passage of marker SZM–$f1$ because of a momentary output of the marker receiver for frequency $f1$ which shunts the stick circuit for relay SZMR.

If the reference velocity signal on wire 124 is greater than the actual velocity signal on wire 69 by a value which is equivalent to more than 4 m.p.h., the DM relay will pick up. The picking up of relay DM causes the picking up of its repeater relay DMP, and the picking up of this relay establishes a stick circuit through its front contact 105 to maintain relay PCC picked up. The velocity mode relay VM is maintained energized at this time by a stick circuit including front contact 104 of relay PCC, back contact 125 of relay SBMR and front contact 106 of relay VM. The picking up of relay DMP does not cause the dropping away of its back contact repeater relay DABP upon the opening of back contact 62 of relay DMP because of a circuit closed for relay DABP through back contact 77 of relay ACC. The signal $V_D$ from wire 111 continues to be a reference signal as selected in the velocity mode until the speed of the vehicle is reduced to deenergize relay DM and in turn cause the dropping away of relay PCC. The dropping away of relay DM under these conditions shifts the control of the vehicle into a programmed station stop mode. This change is made in accordance with the dropping away of relay DMP, which in turn causes the dropping away of relays PCC and VM by opening the stick circuit for relay PCC at front contact 105. The dropping away of relay PCC opens the stick circuit for relay VM at front contact 104.

With reference to FIG. 4A, the dropping away of relay PCC establishes a circuit to connect the output of amplifier 122 through front contact 123 of relay 3P, back contact 109 of relay PCC, front contact of relay DABP, wire 111 and resistor 112 to the input of deviation detector 32. Thus the reference voltage which is generated to correspond to a reference braking pattern becomes a reference for comparison with the actual velocity signal in the deviation detector 32. The actual velocity signal $V_A$ is applied as during the velocity mode to the amplifier 32 through front contact 113 of relay DABP, wire 114 and resistor 115.

In general, the braking pattern reference signal is obtained by integrating the actual velocity signal to convert velocity to distance, multiplying this signal by a factor and extracting the square root, and then obtaining feedback modification in accordance with a selected rate of deceleration. An integrator 126 (see FIG. 4A) is set with an input reference potential indicative of the maximum entering speed for the station stop zone. This signal is applied before entrance to the zone when the relay MCH is in its picked up position. The circuit includes resistor 127, front contact 128 of relay 500MR, back contact 129 of relay SMBP and front contact 130 of relay MCH. As soon as the vehicle enters the station stop zone, the relay MCH becomes dropped away to open the circuit just described and apply an actual velocity signal $V_A$ to the integrator 126. This signal is applied through potentiometer 131, resistor 132, back contact 133 of relay SMBP and back contact 130 of relay MCH. The output of amplifier 126 is characteristic of the distance to go in the station stop zone, and the distance is integrated down by the actual velocity signal so that the output of amplifier 126 is always indicative of the distance to go to the stopping point within the station stop zone. The output of amplifier 126 is applied to a device 134 in which the square root is obtained, and the output of this device is applied as an input to amplifier 135 which multiplies the output signal of device 134 by a factor proportional to the deceleration rate required to stop the train at the desired distance from the station zone marker. The output of amplifier 135 is equivalent to the square root of ten times the distance. This output is applied through resistor 140 as an input to amplifier 122. A diode 141 is connected across the amplifier 135 to prevent the output of the amplifier from going positive. The amplifier 122 multiplies the input applied from amplifier 135 by $2a$ to provide a desired speed output signal $V_D$ of amplifier 122 which varies as the vehicle progresses in accordance with the desired speed at the respective points along the station stop zone.

The multiplication factor for the amplifier 122 is selected in accordance with the desired rate of deceleration by contact 136 of relay SMBP and also by the reference velocity modification switch 138. With the switch 138 in the position shown, a feedback circuit for amplifier 122 is closed through back contact 136 of relay SMBP, contact 137 of switch 138 and resistor 139.

When the vehicle progresses to the marker 500M–f2 (see FIG. 1), the marker relay 500MR (see FIG. 3) becomes dropped away, the dropping away of this relay is effective to pick up the marker change relay MCH momentarily by establishing a charge circuit for capacitor 142 through back contact 143 of relay 500MR, front contact 144 of relay 100MR, front contact 145 of relay SMR and back contact 61 of relay SZMR. This momentary energization of relay MCH is effective to reset the amplifier 126 (see FIG. 4A) to a predetermined signal value in accordance with the vehicle having 500 feet to go to its stopping point. Reset energy is applied to amplifier 126 at this time through front contact 146 of relay 100MR, resistor 148, back contact 128 of relay 500MR, back contact 129 of relay SMBP and front contact 130 of relay MCH. Similarly, the integrator 126 is reset to a value in accordance with the distance the vehicle should have to go at the point where the vehicle reaches the marker 100MR. At this time, the reset potential is applied to amplifier 126 through back contact 146 of relay 100MR, resistor 148, back contact 128 of relay 500MR, back contact 129 of relay SMBP, and front contact 130 of relay MCH.

When the vehicle reaches the stop marker SM–f4, the relay SMR becomes dropped away, and it picks up its back contact repeater relay SMBP upon the closure of its back contact 149. The picking up of relay SMBP, with the relay MCH in its picked up position resets the integrator 126 through a circuit including resistor 150, front contact 129 of relay SMBP and front contact 130 of relay MCH. This provides a setting for a distance to stop of 30 feet, and this time, when the integrator 126 is reset, the setting takes into account a change in scale to use a scale many times greater than is normally used to provide greater accuracy in the control of the vehicle in the final 30 foot section of the station stop zone. This scale change can be, for example, in the order of 30 times greater than normal. The scale change is also made in the circuit through back contact 130 of relay MCH wherein the distance to go is adjusted in accordance with integration of the output signal of the axle driven generator 67. The scale change in this circuit is rendered effective by the closure of front contact 133 of relay SMBP to select the resistor 151 to be included in the circuit applying energy through back contact 130 of relay MCH.

While the vehicle is within the station stop zone, the deviation detector 32 has an input $A_D{}^2$ of negative polarity in accordance with the desired rate of deceleration. This input is applied from a negative source of energy through front contact 152 of relay PCCBP, back contact 153 of relay SMBP, resistor 154, wire 155 and resistor 156. Upon the progress of the vehicle to the stop marker SM–f4 (see FIG. 1), the relay SMBP becomes picked up to reduce the input to the deviation detector 32 as to the desired rate of deceleration by the selection of resistor 157 to be included in the circuit for providing a deceleration reference signal to the deviation detector 32, rather than the resistor 154 which is used in the circuit during the passage of the vehicle through the first part of the station stop zone. It is desirable for the comfort of the passengers that the rate of deceleration be shifted to a lower rate at the lower vehicle speed within 30 feet of the stopping point.

The actual velocity signal is not modified in accordance with the scale change, and therefore the gain of amplifier 122 is changed to compensate for the scale change in accordance with the picking up of relay SMBP. The picking up of this relay connects the feedback circuit for amplifier 122 through front contact 136 of relay SMBP and through resistor 158. The dead band control 44 and inputs to the deviation detector 32 from the amplifier 122, act to maintain a speed very close to the programmed stopping curve to bring the front of the vehicle to a final stop within a very short distance of a predetermined stopping point at the station platform.

If it should be desirable to have different stopping patterns for different station platforms because, for example, of different track grades, the marker SZM–f1 of FIG. 1 can be tuned to different frequencies for different stations. These frequencies can convey to the vehicles particular distinctive braking patterns that should be used in stopping at such stations.

In case the vehicle should stop short of the station platform, provision is made for operating the vehicle at low speed until it reaches the normal stopping position. Such control is provided by the 3 m.p.h. stick relay 3P.

When the vehicle stops before having reached the stop marker SM–f4 (see FIG. 1), the relay 3P becomes dropped away, and the dropping away of this relay applies a fixed signal to the deviation detector 32 as a reference signal, which causes the vehicle to be operated at low speed to the stopping point. This signal is applied through resistor 160 (see FIG. 4B), back contact 123 of relay 3P, back contact 109 of relay PCC, front contact 110 of relay DABP, wire 11 and resistor 112, as an input to deviation detector 32. This signal will be applied until the vehicle reaches the stop marker SM–f4, at which time the relay 3P (see FIG. 3) becomes picked up upon the closure of back contact 159 of stop marker relay SMR. The picking up of relay 3P opens the circuit at back contact 123 (see FIG. 4A) through which energy has been applied to deviation detector 32, and thus the vehicle is brough to stop in the usual manner within the next 30 feet.

After the vehicle has come to a stop at the station platform, the doors of the vehicle are automatically opened to discharge the passengers, and in accordance with the opening of the doors, a reset circuit is closed which has been described for resetting the marker repeater relays SZMR, 500MR, 100MR and SMR. The doors are subsequently closed after a predetermined time interval, and this indicates that the vehicle is ready to proceed. The vehicle is automatically started in accordance with the closure of contact 48 (see FIG. 4A) which is associated with the operation of the doors to their closed positions. From this point, the vehicle becomes accelerated by a mode of operation which has been heretofore described until it approaches a predetermined reference speed, at which time it then is placed in a velocity mode as has been heretofore described.

Although it is contemplated that the present invention is to be used with a vehicle having a controller that will automatically regulate the tractive effort and the braking effort in accordance with sensing the current in the closed loop circuit including wires 87 and 88, it is also to be understood that the control system according to the present invention can be used to control vehicles that are not so equipped. In other words, if a vehicle to be controlled does not have the type of controller that has been contemplated, relay means can be provided, for example, to sense different levels of current in the closed loop circuit, and upon registration of these levels, a selection can be made as to the desired tractive effort of the vehicle or the desired braking, and the vehicle can be controlled in accordance with this selection.

More specifically, a step-up and step-down means can be provided to be controlled by respective up and down sensing devices in response to current in the loop circuit wherein the stepping up calls for more tractive effort of the vehicle in accordance with an increase in current in the loop circuit, and wherein a stepping down for a predetermined normal level can be used to determine various degrees of reduction of tractive effort and of braking to be applied by the vehicle. The integrator 33 can be reset, for example, after each such step to a normal level which may be an output of .5 amp in the closed loop, and further action of the stepper to step up or step down can be made dependent upon further deviation from this setting.

Having thus described one embodiment of a system for the automatic operation of a vehicle under respective different modes of operation, it is to be understood that this form is selected for the purpose of facilitating a disclosure of the present invention rather than to limit the number of forms the present invention may assume. While the invention has been described in its preferred embodiment, it is to be understood that the words which have been used are words of description rather than of limitation and that changes within the purview of the appending claims may be made without departing from the true scope and spirit of the invention in its broader aspects.

What we claim is:

1. A system for generating a control signal to govern operation of a vehicle along a right of way comprising; mode selecting means selectively activated responsive to operation of the vehicle along the right of way to designate velocity and acceleration modes respectively for governing generation of the control signal; means for generating continuously a reference velocity signal and an actual velocity signal for the vehicle; control signal generating means for generating a control signal for governing operation of the vehicle, said control signal generating means being effective to compare the reference velocity signal and the actual velocity signal to obtain the vehicle control signal when the velocity mode is designated by the mode selecting means, and said control signal generating means being effective to compare an actual acceleration signal with a reference acceleration signal to obtain the vehicle control signal when the acceleration mode is designated by the mode selecting means; and detecting means for selectively activating the mode selecting means to designate the velocity mode or the acceleration mode in accordance with whether or not there is a substantial difference between the reference velocity and actual velocity signals.

2. A system according to claim 1 wherein the reference speed signal is selected in accordance with traffic conditions along the right of way in advance of the vehicle.

3. A system according to claim 1 wherein the control signal generating means comprises a deviation detector which selectively compares the reference velocity and actual velocity signals or the reference acceleration and actual acceleration signals respectively in accordance with the velocity or acceleration mode that is designated respectively.

4. The system according to claim 3 wherein the control signal generating means comprises an integrator for integrating an output signal from the deviation detector and wherein an output signal of the integrator is used to govern the power operation of the vehicle.

5. The system according to claim 4 wherein the control signal generating means comprises a converter for converting the output voltage signal of the integrator into a current modulated signal for controlling power operation of the vehicle.

6. In a system for generating a control signal for governing power operation of a vehicle along a right of way, means for continuously generating a reference velocity signal and an actual velocity signal for the vehicle, means for differentiating the actual velocity signal to obtain an acceleration signal, and deviation detector means for comparing the reference velocity signal and the actual velocity signal and the acceleration signal to obtain an error signal for controlling power operation of the vehicle, the reference velocity signal being of opposite character relative to the actual velocity signal and the acceleration signal derived from changing velocity, whereby damping is provided by the acceleration signal to cause a tapering off of the error signal in accordance with the acceleration of the vehicle.

7. The invention according to claim 6 wherein biasing means is provided for the deviation detector means which is governed by the actual velocity signal to provide a dead band of control in which no error signal is generated by the deviation detector when the vehicle varies in speed slightly above or below a speed corresponding to the reference speed signal.

8. A system for generating a control signal to govern operation of a vehicle along a right of way having respective motoring and stopping zones comprising: mode selector means selectively activated in response to operation of the vehicle along the right of way to designate velocity, acceleration, and stopping modes respectively for governing generation of the control signal; means for generating continuously a reference velocity signal and an actual velocity signal for the vehicle; and control signal generating means for generating a control signal for governing the operation of the vehicle, said control signal being generated by comparing the reference velocity signal and the actual velocity signal when the mode selector is activated to designate the velocity mode, said control signal being generated by comparing an actual acceleration signal with a reference acceleration signal when the mode selector is activated to designate an acceleration mode, and said control signal being generated by comparing the actual velocity signal with a reference velocity signal indicative of a predetermined stopping pattern when the mode selector is activated to designate a stopping mode; said mode selector means including detector means for activating the mode selector to designate a velocity mode in response to the actual velocity signal and the reference velocity signal being of substantially comparable values when the vehicle is in the motoring zone, said mode selector means including detector means for activating the mode selector to designate the acceleration mode in response to the actual velocity signal being less than the reference velocity signal by a predetermined difference in relative values when the vehicle is in the motoring zone, and said mode selector means being activated to designate the stopping mode in response to the passage of the vehicle within the stopping zone.

9. The system according to claim 8 wherein the control signal is generated in accordance with a designated velocity mode after the vehicle enters the stopping zone until the actual speed of the vehicle exceeds a vehicle speed corresponding to the reference signal indicative of a predetermined stopping pattern.

10. The system according to claim 8 wherein resetting means is provided for deactivating the stopping mode designation in response to the opening of the vehicle doors.

11. The system according to claim 8 wherein the mode selector is actuated to designate an acceleration mode in response to the closure of the vehicle doors when the vehicle is within the stopping zone.

12. In a system for generating a continuous signal for governing the stopping of a vehicle in a stopping zone along a right of way, there being a first marker at the entrance to the stopping zone and at least one intermediate marker at an intermediate point in the zone, reference signal generating means rendered effective in response to the passage of the vehicle past the first marker for continuously generating a reference signal indicative of a desired speed according to a first rate of deceleration for the vehicle within the stopping zone, means for generating an actual velocity signal continuously indicative of the actual velocity of the vehicle as it passes through the stopping zone, deviation detector means for comparing the reference signal and the actual velocity signal to obtain an error signal for controlling the speed of the vehicle, and means responsive to the passage of the vehicle past the intermediate marker for adjusting the reference signal generating means to continuously generate a reference signal indicative of a desired speed according to a second rate of deceleration of the vehicle different than the first rate.

13. The system according to claim 12 wherein the second rate of deceleration is less than the first rate of deceleration.

14. The system according to claim 12 wherein sensitivity of the deviation detector is improved by multiplying its inputs by selected multiplication factors.

15. The system according to claim 14 wherein a higher multiplication factor is selected in response to the passage of the vehicle past the intermediate marker.

16. In a system for generating a control signal to govern operation of a vehicle along a right of way having respective motoring and stopping zones comprising, mode selecting means selectively activated at times by the operating condition of the vehicle and at other times by the passage of the vehicle into a stopping zone to designate velocity, acceleration and stopping modes respectively for governing generation of the control signals, and deviation detector means for generating the control signal comprising a first operational amplifier having different inputs selected in accordance with the designation by said mode selecting means of the velocity, acceleration and stopping modes respectively, the inputs comprising reference and actual velocity signals when the velocity mode is designated, the inputs comprising reference and actual acceleration signals when the acceleration mode is designated, and the inputs comprising braking pattern reference and actual velocity signals when the stopping mode is designated.

17. The system according to claim 16 wherein the control signal generated by the first operational amplifier is applied as an input to integrating means comprising a second operational amplifier for generating a second control signal as an output of the integrating means.

18. The system according to claim 17 wherein the output of the integrating means is applied as an input to modulating and voltage-to-current converter means for providing a closed loop modulated current output signal to control at least the propulsion power operation of the vehicle.

19. The system according to claim 18 wherein the closed loop circuit is used to control both the propulsion power and the brakes of the vehicle.

No references cited.

ARTHUR L. LA POINT, *Primary Examiner.*

S. T. KRAWCZEWICZ, *Examiner.*